(12) United States Patent
Sue et al.

(10) Patent No.: US 11,402,650 B2
(45) Date of Patent: Aug. 2, 2022

(54) OPTICAL UNIT WITH SHAKE CORRECTION FUNCTION

(71) Applicant: NIDEC SANKYO CORPORATION, Nagano (JP)

(72) Inventors: Takeshi Sue, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 358 days.

(21) Appl. No.: 16/830,241

(22) Filed: Mar. 25, 2020

(65) Prior Publication Data

US 2020/0310151 A1 Oct. 1, 2020

(30) Foreign Application Priority Data

Mar. 28, 2019 (JP) .............................. JP2019-062237

(51) Int. Cl.
*G02B 27/64* (2006.01)
*H04N 5/225* (2006.01)
*H04N 5/232* (2006.01)

(52) U.S. Cl.
CPC ......... *G02B 27/646* (2013.01); *H04N 5/2254* (2013.01); *H04N 5/2257* (2013.01);
(Continued)

(58) Field of Classification Search
CPC ............... H04N 5/2254; H04N 5/2253; H04N 5/23287; H04N 5/2257; G02B 27/646;
(Continued)

(56) References Cited

U.S. PATENT DOCUMENTS 8,049,782 B2 11/2011 Noji
9,143,690 B2 9/2015 Hu et al.
(Continued)

FOREIGN PATENT DOCUMENTS

CN 101286501 10/2008
CN 104144293 11/2014
(Continued)

OTHER PUBLICATIONS

Office Action of China Counterpart Application, with English translation thereof, dated May 8, 2021, pp. 1-16.

*Primary Examiner* — Pritham D Prabhakher
(74) *Attorney, Agent, or Firm* — JCIPRNET

(57) ABSTRACT

An optical unit with a shake correction function includes a movable body having an optical module, a gimbal mechanism structured to swingably support the movable body around a first axial line and a second axial line, a fixed body supporting the movable body through the gimbal mechanism, and a shake correction drive mechanism structured to swing the movable body around the first axial line and around the second axial line. The gimbal mechanism includes a gimbal frame which connects the movable body with the fixed body, the gimbal frame has a first frame portion located on one side in an optical axis direction with respect to a first end part which is an end part on the one side of the fixed body, and the movable body has a movable body protruded portion located on the one side in the optical axis direction with respect to the first end part.

8 Claims, 7 Drawing Sheets

(52) U.S. Cl.
CPC . *H04N 5/23287* (2013.01); *G03B 2205/0007* (2013.01); *G03B 2205/0053* (2013.01)

(58) Field of Classification Search
CPC .... G03B 2205/0007; G03B 2205/0053; G03B 2205/0069; G03B 5/00
USPC .......................................................... 359/554
See application file for complete search history.

(56) References Cited

U.S. PATENT DOCUMENTS

| | | | |
|---|---|---|---|
| 9,527,161 B2* | 12/2016 | Watanabe | B23K 26/20 |
| 9,891,444 B2* | 2/2018 | Minamisawa | H04N 5/23287 |
| 9,933,629 B2* | 4/2018 | Minamisawa | H04N 5/2254 |
| 9,936,134 B2 | 4/2018 | Enta | |
| 10,048,508 B2* | 8/2018 | Sue | H02K 41/0356 |
| 10,185,156 B2 | 1/2019 | Minamisawa et al. | |
| 10,191,297 B2* | 1/2019 | Yanagisawa | G03B 5/00 |
| 10,389,941 B2* | 8/2019 | Minamisawa | G02B 7/023 |
| 10,663,754 B2* | 5/2020 | Minamisawa | H04N 5/23264 |
| 10,859,846 B2* | 12/2020 | Arai | G02B 7/08 |
| 10,884,215 B2* | 1/2021 | Kuo | G02B 27/646 |
| 10,976,640 B2* | 4/2021 | Minamisawa | G02B 7/02 |
| 2010/0091120 A1* | 4/2010 | Nagata | H04N 5/2257 359/557 |
| 2013/0093947 A1* | 4/2013 | Lee | G03B 17/12 348/E5.026 |
| 2015/0195459 A1* | 7/2015 | Yeo | G03B 5/00 359/557 |
| 2016/0161756 A1* | 6/2016 | Liu | G02B 27/646 359/557 |
| 2016/0170227 A1* | 6/2016 | Minamisawa | H04N 5/2257 359/557 |
| 2016/0170229 A1* | 6/2016 | Park | G02B 27/646 359/557 |
| 2016/0231641 A1* | 8/2016 | Minamisawa | H04N 5/23258 |
| 2017/0003517 A1* | 1/2017 | Sue | H02K 41/0356 |
| 2017/0353662 A1* | 12/2017 | Enta | G03B 5/00 |
| 2018/0171991 A1* | 6/2018 | Miller | F16F 15/002 |
| 2018/0284476 A1 | 10/2018 | Minamisawa | |
| 2018/0321505 A1* | 11/2018 | Minamisawa | H04N 5/23287 |
| 2019/0137780 A1* | 5/2019 | Arai | H04N 5/23287 |

FOREIGN PATENT DOCUMENTS

| | | |
|---|---|---|
| CN | 104570547 | 4/2015 |
| CN | 104919366 | 9/2015 |
| CN | 105247413 | 1/2016 |
| CN | 107092066 | 8/2017 |
| CN | 107111208 | 8/2017 |
| EP | 2394425 | 5/2017 |
| JP | 2014006522 | 1/2014 |
| WO | 2008012868 | 1/2008 |

* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2019-062237 filed on Mar. 28, 2019, and the entire content of which is incorporated herein by reference.

TECHNICAL FIELD

The present disclosure relates to an optical unit with a shake correction function structured to perform a shake correction of an optical module.

BACKGROUND

An optical unit which is mounted on a portable terminal or a movement body may include a mechanism structured to swing or turn a movable body on which an optical module is mounted to correct a shake in order to restrain disturbance of a photographed image of the portable terminal or when the movement body is moved. Such an optical unit with a shake correction function is disclosed in Japanese Patent Laid-Open No. 2014-006522 (Patent Literature 1). The optical unit with a shake correction function described in Patent Literature 1 includes a gimbal mechanism structured to swingably support a movable body. The gimbal mechanism includes a gimbal frame (movable frame) formed in a frame shape. In Patent Literature 1, the movable body and the gimbal frame are accommodated in an inside of a case which is a fixed body side component.

In a structure that a gimbal frame is disposed on an outer peripheral side of a movable body as described in Patent Literature 1, a space for disposing the gimbal frame is required to be provided between an outer peripheral face of the movable body and a case (fixed body). Therefore, an outer shape of a case which is viewed in an optical axis direction is enlarged and it is difficult to reduce a size of an outer shape of an optical unit with a shake correction function viewed in the optical axis direction. The present applicant has proposed, in Japanese Patent Application No. 2018-156088, a structure that a gimbal frame is disposed on a front side (object side) in the optical axis direction with respect to a movable body, and frame end parts are extended to a side of the movable body from corner parts of the gimbal frame.

However, in a case that the gimbal frame is disposed on a front side in the optical axis direction with respect to the movable body, although an outer shape of a case which accommodates the movable body and the gimbal frame when viewed in the optical axis direction can be reduced, a dimension in the optical axis direction of the case is increased. Therefore, a dimension in the optical axis direction of a fixed body is increased and thus, a height in the optical axis direction of a space for installing an optical unit with a shake correction function becomes large and mounting of the optical unit on a thin device is difficult.

For example, in order to mount an optical unit with a shake correction function on a portable device or the like, in a case that a cover glass for covering an optical module is provided in the portable device, a buffer member for fixing or the like is disposed between the cover glass and a fixed body.

However, in this structure, a total or more of a height in the optical axis direction of the fixed body and a height in the optical axis direction of the buffer member for fixing is required as a height in the optical axis direction of an arrangement space of an optical unit with a shake correction function in a portable device. Therefore, when a dimension in the optical axis direction of a fixed body is large, it is difficult to reduce a height in the optical axis direction of an arrangement space of an optical unit with a shake correction function, and the optical unit with a shake correction function is difficult to mount on a thin portable device.

The present disclosure provides an optical unit with a shake correction function in which a dimension in an optical axis direction of a fixed body is reduced and a height in the optical axis direction of an arrangement space of the optical unit with a shake correction function is reduced.

SUMMARY

The present disclosure provides an optical unit with a shake correction function including a movable body having an optical module, a gimbal mechanism structured to swingably support the movable body around a first axial line intersecting an optical axis and swingably support the movable body around a second axial line intersecting the optical axis and the first axial line, a fixed body which supports the movable body through the gimbal mechanism, and a shake correction drive mechanism structured to swing the movable body around the first axial line and around the second axial line. The gimbal mechanism includes a gimbal frame which connects the movable body with the fixed body, the gimbal frame is provided with a first frame portion located on one side in the optical axis direction with respect to a first end part which is an end part on the one side of the fixed body, and the movable body is provided with a movable body protruded portion which is located on the one side in the optical axis direction with respect to the first end part.

Other features and advantages of the disclosure will be apparent from the following detailed description, taken in conjunction with the accompanying drawings that illustrate, by way of example, various features of embodiments of the disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

Figure 7:
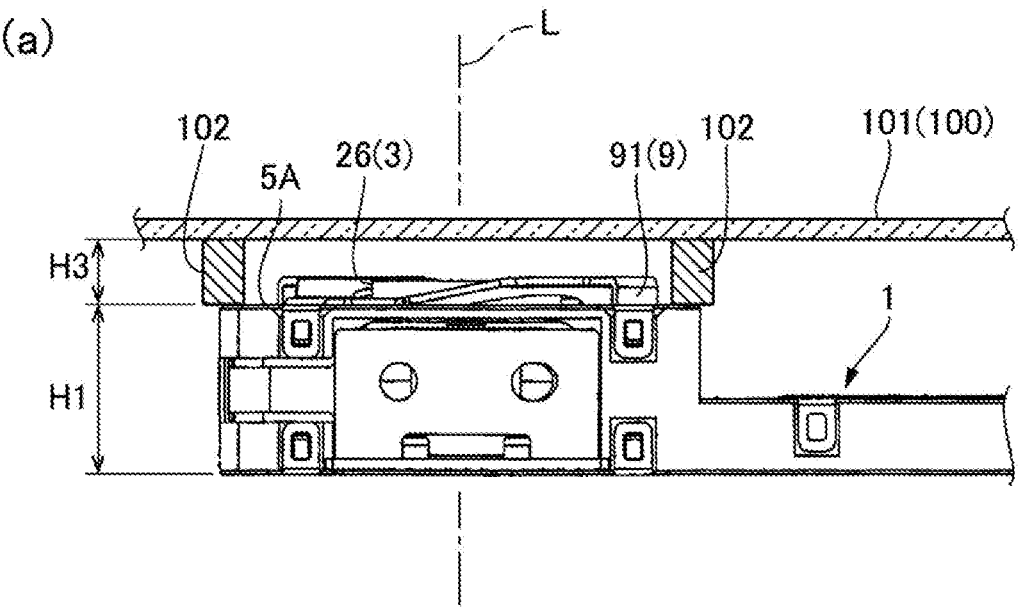
Figure 7:
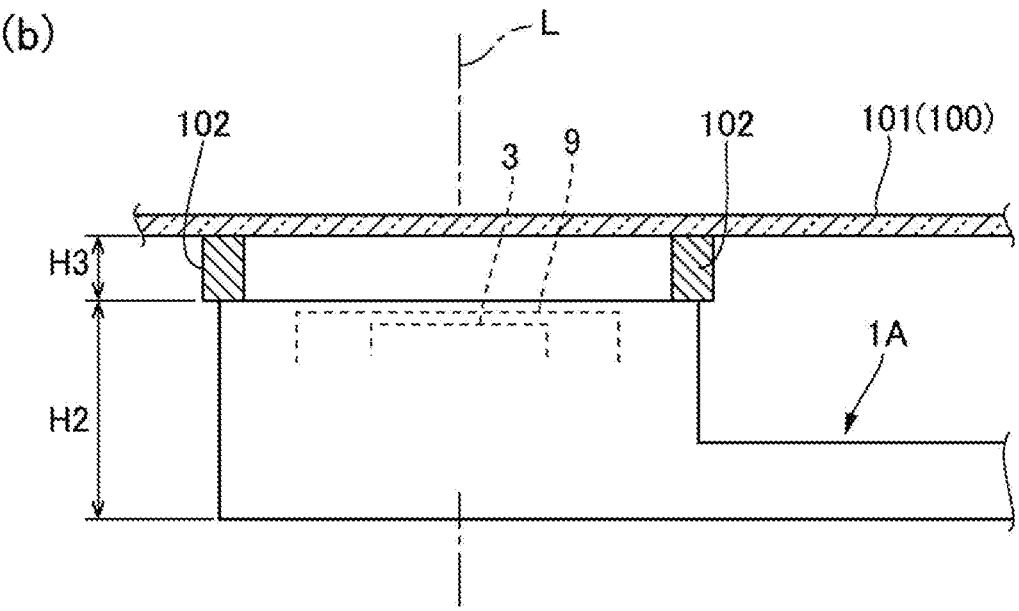

(a) and (b) of FIG. 7 are explanatory views showing an arrangement space of an optical unit with a shake correction function.

DETAILED DESCRIPTION

An embodiment of an optical unit 1 with a shake correction function to which the present disclosure is applied will be described below with reference to the accompanying drawings. In the present specification, three axes of "X", "Y" and "Z" are axial line directions perpendicular to each other, and one side in the "X"-axis direction is indicated with "+X" and the other side is indicated with "−X", one side in the "Y"-axis direction is indicated with "+Y", the other side is indicated with "−Y", and one side in the "Z"-axis direction is indicated with "+Z" and the other side is indicated with "−Z". The "Z"-axis direction is coincided with an optical axis "L" direction of an optical module 2. Further, the "+Z" direction is one side (object side) in the optical axis "L" direction and the "−Z" direction is the other side (image side) in the optical axis "L" direction.

(Entire Structure)

Figure 1:
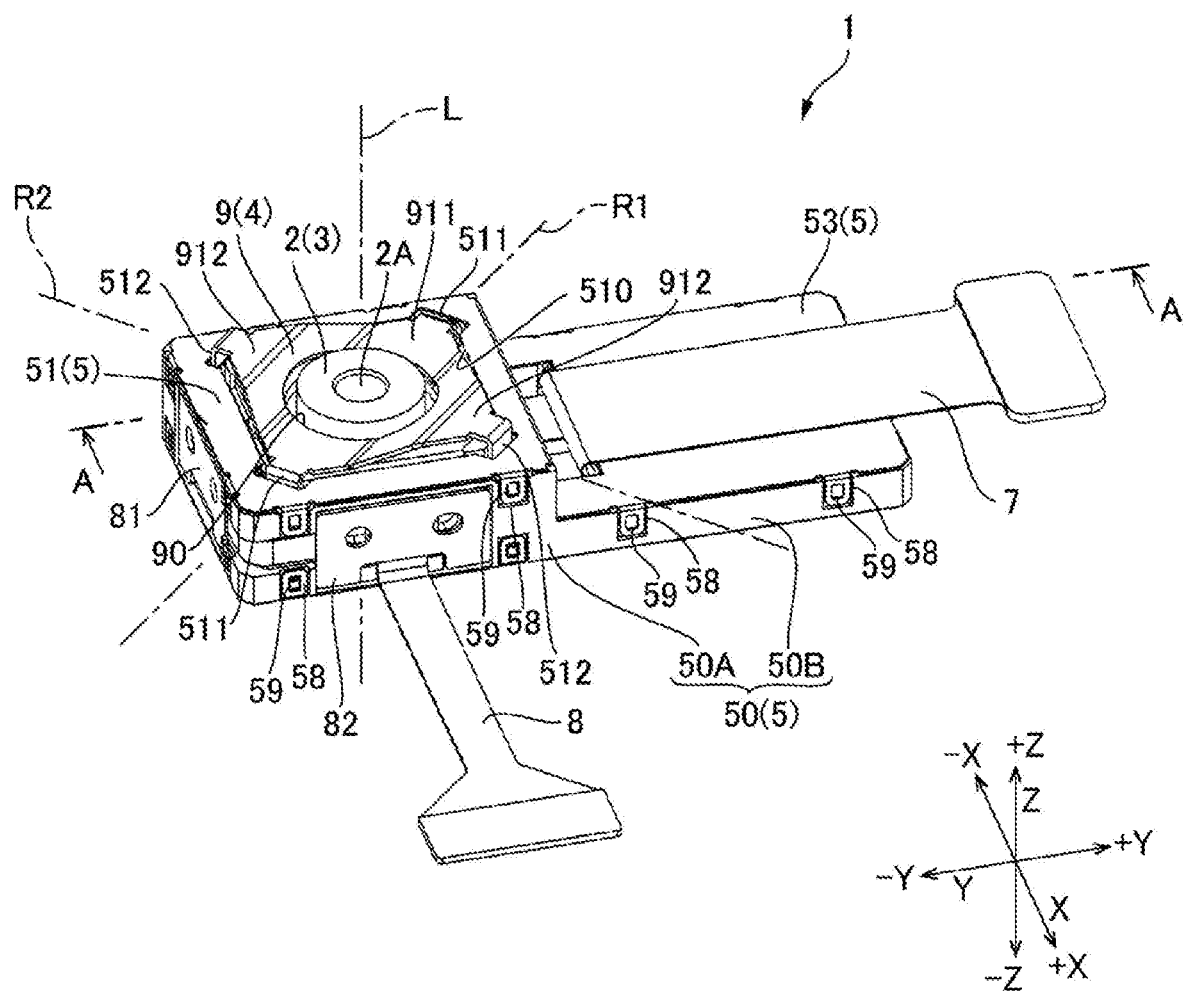
FIG. 1 is an outward perspective view showing an optical unit with a shake correction function in accordance with an embodiment of the present disclosure.
Figure 2:
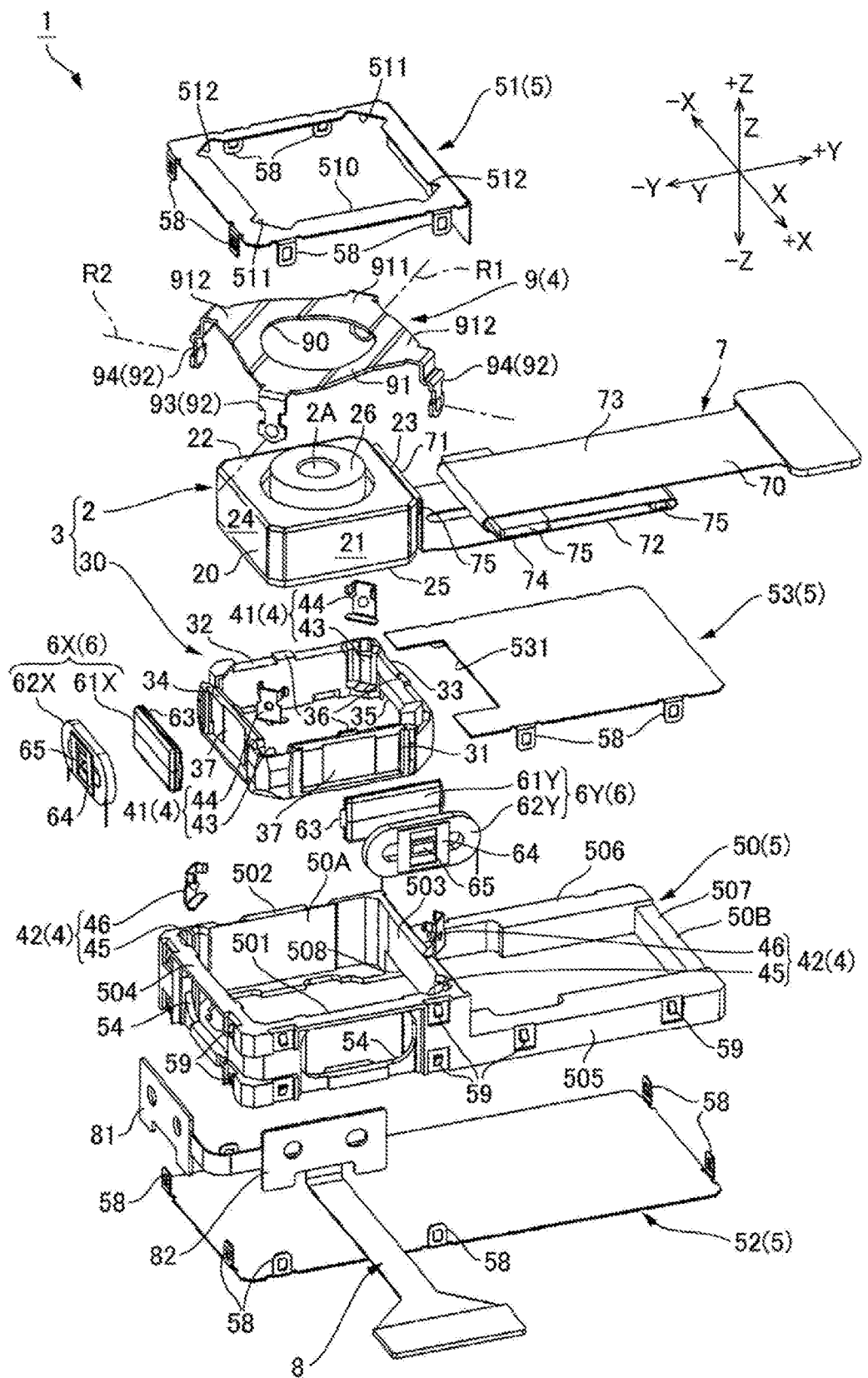
FIG. 2 is an exploded perspective view showing the optical unit with a shake correction function in FIG. 1 which is viewed from one side in an optical axis direction.
Figure 3:
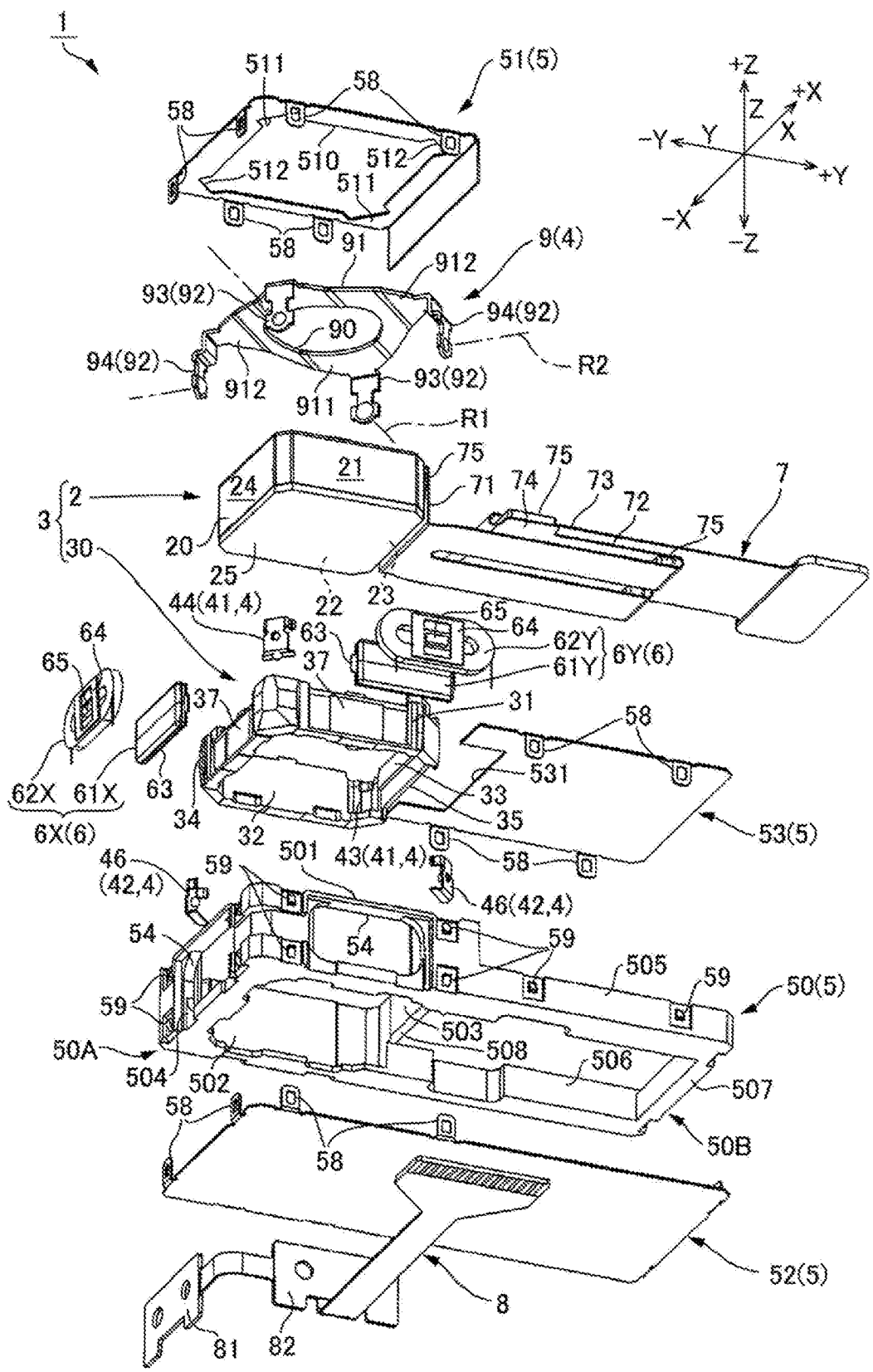
FIG. 3 is an exploded perspective view showing the optical unit with a shake correction function in FIG. 1 which is viewed from the other side in the optical axis direction.
Figure 4:
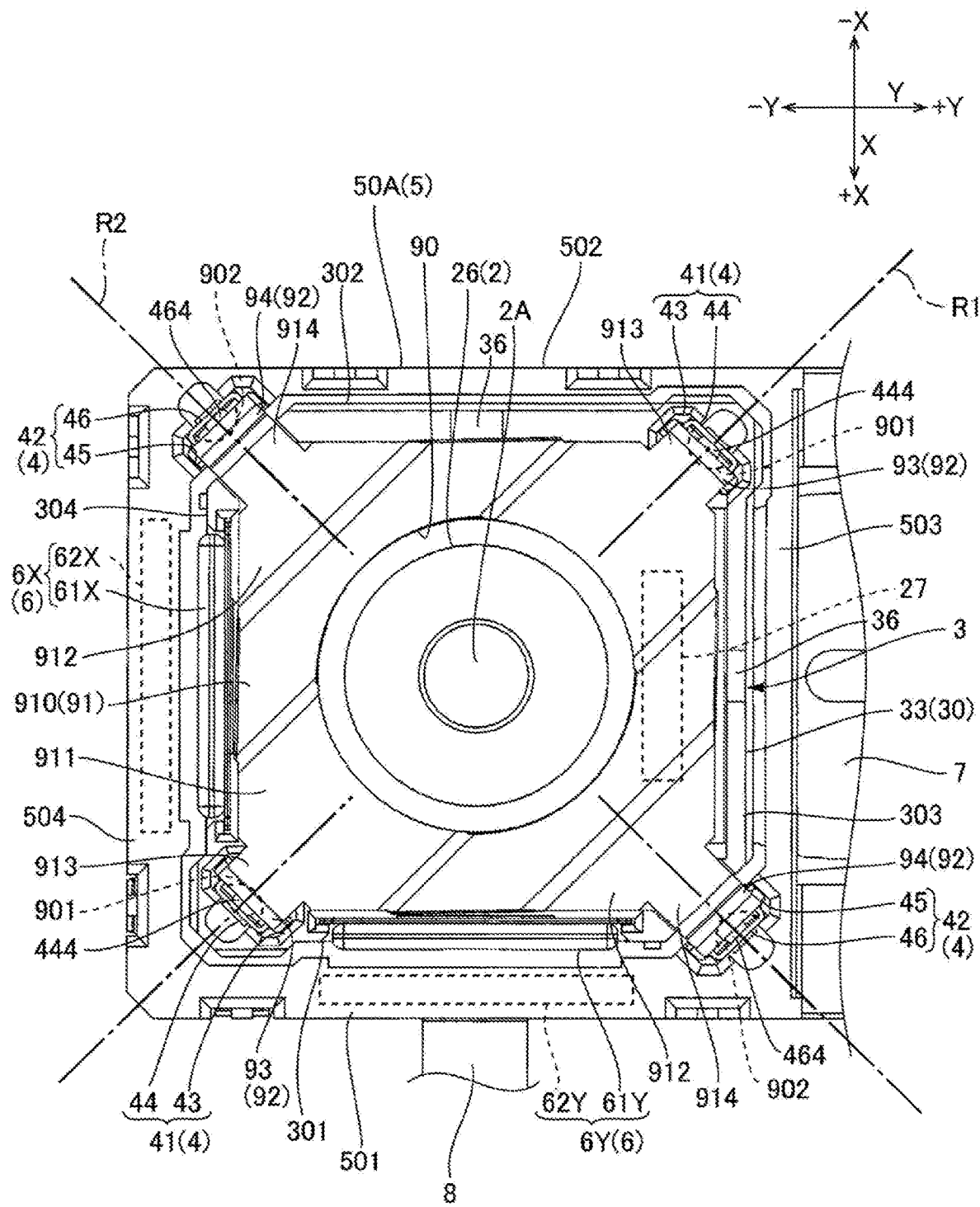
FIG. 4 is a plan view showing an optical unit with a shake correction function in which a cover is detached.
Figure 5:
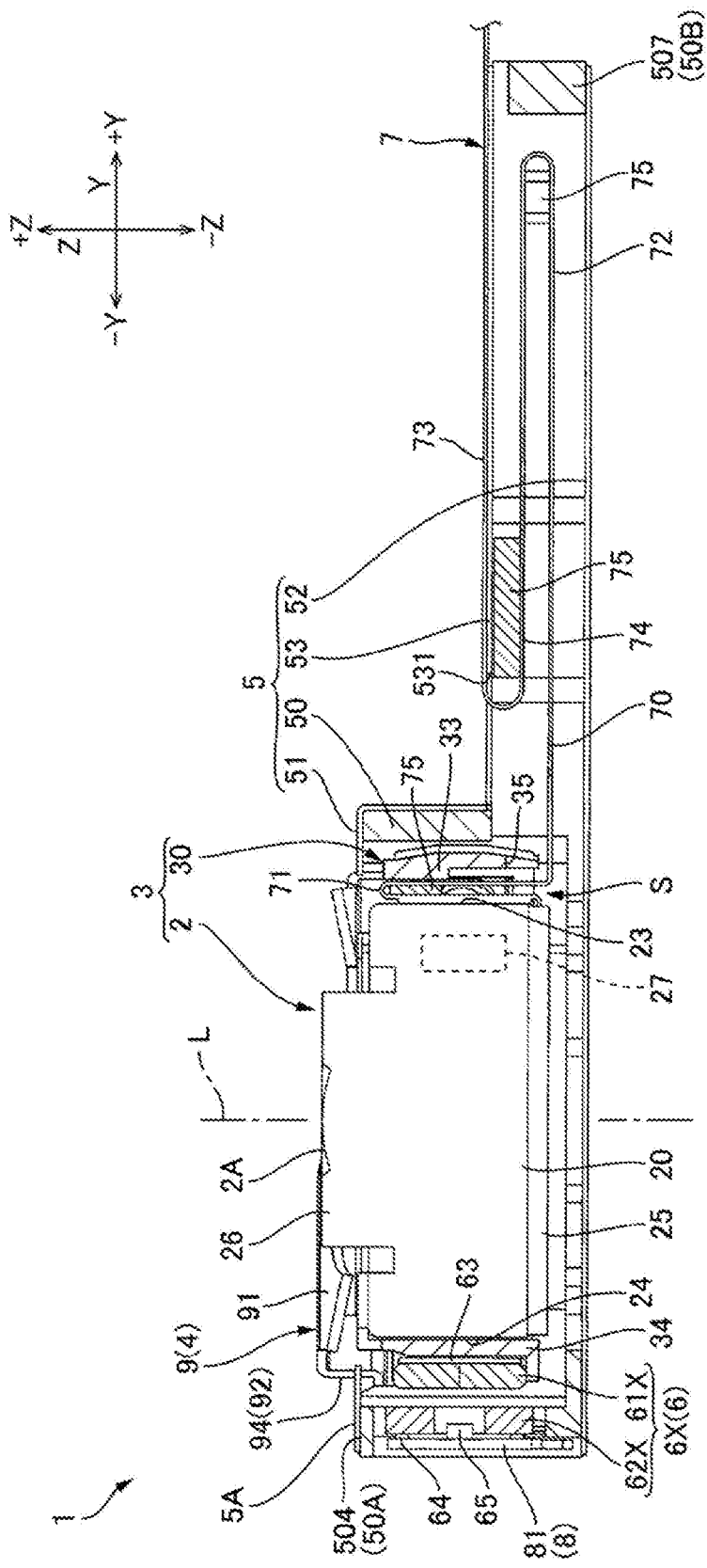
FIG. 5 is a partial cross-sectional view showing the optical unit with a shake correction function in FIG. 1 (partial cross-sectional view at the "A-A" position in FIG. 1).
Figure 6:
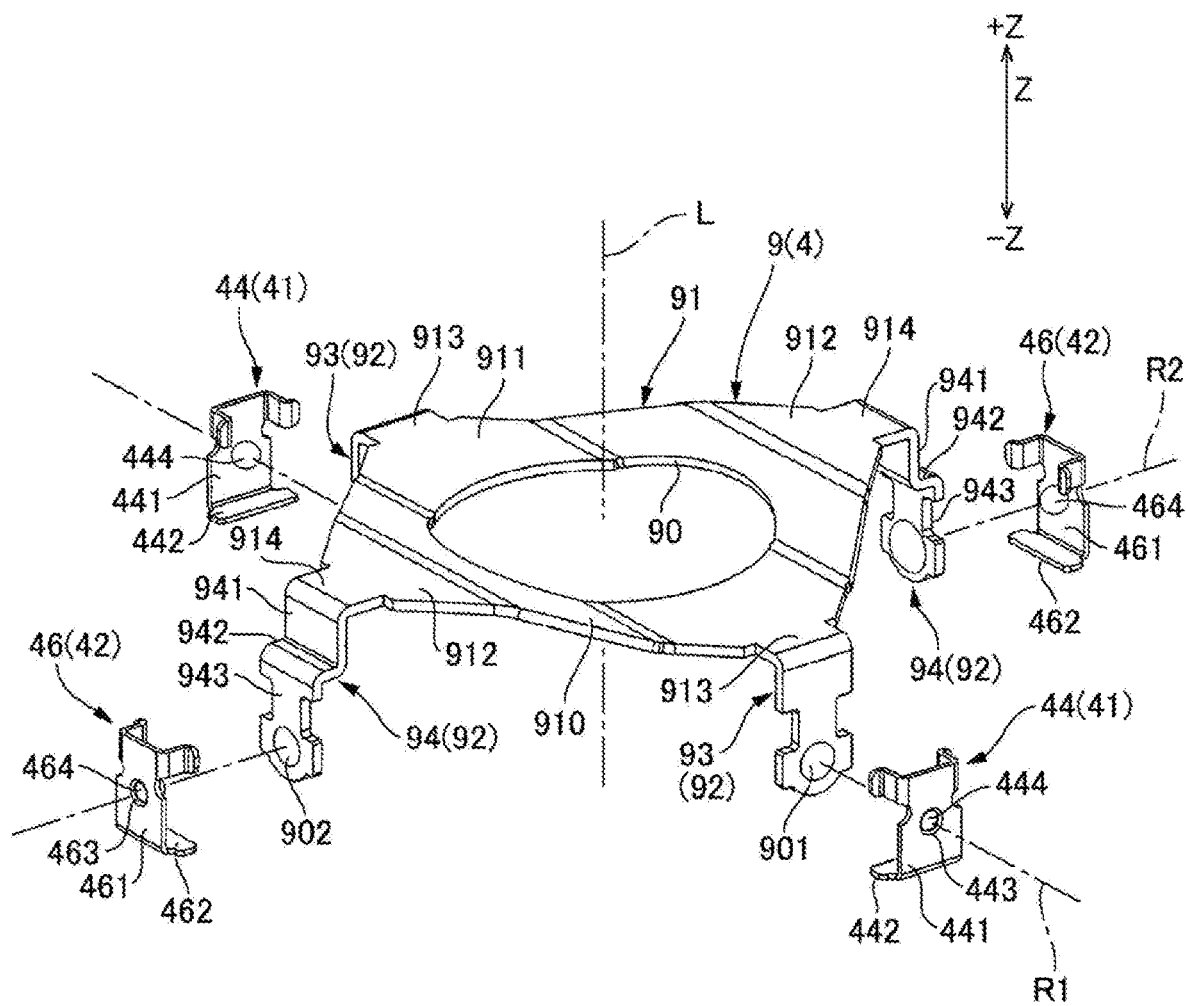
FIG. 6 is an exploded perspective view showing a gimbal frame, first thrust receiving members and second thrust receiving members.

FIG. 1 is a perspective view showing an optical unit 1 with a shake correction function in accordance with an embodiment of the present disclosure. FIG. 2 is an exploded perspective view showing the optical unit 1 with a shake correction function in FIG. 1 which is viewed from one side ("+Z" direction side) in the optical axis "L" direction. FIG. 3 is an exploded perspective view showing the optical unit 1 with a shake correction function in FIG. 1 which is viewed from the other side ("−Z" direction side) in the optical axis "L" direction. FIG. 4 is a plan view showing the optical unit 1 with a shake correction function in which a first cover 51 is detached. FIG. 5 is a partial cross-sectional view showing the optical unit 1 with a shake correction function in FIG. 1 (partial cross-sectional view at the "A-A" position in FIG. 1). FIG. 6 is an exploded perspective view showing a gimbal frame 9, first thrust receiving members 44 and second thrust receiving members 46.

As shown in FIG. 1, an optical unit 1 with a shake correction function includes an optical module 2 having an optical element such as a lens. The optical unit 1 with a shake correction function is, for example, used in an optical device such as a cell phone with a camera and a drive recorder or in an optical device such as an action camera mounted on a movement body such as a helmet, a bicycle, a radio-controlled helicopter or a wearable camera. In the optical device, when a shake is occurred in the optical device at the time of photographing, a photographed image is disturbed. In order to avoid a photographed image being inclined, the optical unit 1 with a shake correction function corrects an inclination of the optical module 2 based on acceleration, turning speed, shaking amount and the like detected by a detection means such as a gyroscope.

As shown in FIGS. 1 through 5, the optical unit 1 with a shake correction function includes a movable body 3 on which the optical module 2 is mounted, a gimbal mechanism 4 structured to swingably support the movable body 3, a fixed body 5 which supports the movable body 3 through the gimbal mechanism 4, a shake correction drive mechanism 6 structured to swing the movable body 3 with respect to the fixed body 5, a first flexible printed circuit board 7 which is connected with the movable body 3, and a second flexible printed circuit board 8 which is attached to the fixed body 5. The first flexible printed circuit board 7 includes a connector part which is provided at an end part on an opposite side to a side connected with the movable body 3. Further, the second flexible printed circuit board 8 includes a terminal part which is provided at an end part on an opposite side to a side attached to the fixed body 5.

The optical unit 1 with a shake correction function performs a shake correction by swinging the movable body 3 around two axes ("X"-axis and "Y"-axis) which intersect the optical axis "L" ("Z"-axis) and intersect each other. A shake correction around the "X"-axis and a shake correction around the "Y"-axis are performed and thereby, a shake correction in a pitching (vertical swing) direction and a shake correction in a yawing (lateral swing) direction are performed.

As shown in FIGS. 1 and 4, the movable body 3 is swingably supported around a first axial line "R1" perpendicular to the optical axis "L" ("Z"-axis) and is swingably supported around a second axial line "R2" perpendicular to the optical axis "L" and the first axial line "R1" by the gimbal mechanism 4. The first axial line "R1" and the second axial line "R2" are inclined by 45 degrees with respect to the "X"-axis and the "Y"-axis. When turning around the first axial line "R1" and turning around the second axial line "R2" are combined, the movable body 3 can be swung around the "X"-axis and the "Y"-axis. Therefore, the movable body 3 is swingably supported around the "X"-axis and around the "Y"-axis by the gimbal mechanism 4.

As shown in FIG. 4, the gimbal mechanism 4 includes first supporting point parts 41 provided at diagonal positions on the first axial line "R1" of the movable body 3, second supporting point parts 42 provided at diagonal positions on the second axial line "R2" of the fixed body 5, and a gimbal frame 9. The gimbal frame 9 is a plate spring made of metal and is provided with two first support parts 901 provided at diagonal positions on the first axial line "R1" and two second support parts 902 provided at diagonal positions on the second axial line "R2". The gimbal mechanism 4 is assembled so that the first support part 901 is point-contacted with the first supporting point part 41 and the second support part 902 is point-contacted with the second supporting point part 42. As a result, the movable body 3 is swingably supported around the first axial line "R1" and swingably supported around the second axial line "R2" through the gimbal frame 9.

As shown in FIGS. 2 through 4, the shake correction drive mechanism 6 includes a first magnetic drive mechanism 6X structured to turn the movable body 3 around the "X"-axis and a second magnetic drive mechanism 6Y structured to turn the movable body 3 around the "Y"-axis. In this embodiment, the first magnetic drive mechanism 6X and the second magnetic drive mechanism 6Y are respectively disposed at one position.

The first magnetic drive mechanism 6X includes one set of a magnet 61X and a coil 62X. Further, the second magnetic drive mechanism 6Y includes one set of a magnet 61Y and a coil 62Y. The magnet 61X and the coil 62X of the first magnetic drive mechanism 6X face each other in the "Y"-axis direction. The magnet 61Y and the coil 62Y of the second magnetic drive mechanism 6Y face each other in the "X"-axis direction. In this embodiment, the magnets 61X and 61Y are disposed on the movable body 3 and the coils 62X and 62Y are disposed on the fixed body 5. The arrangement of the magnets 61X and 61Y and the coils 62X and 62Y may be reversed to this embodiment. In other words, it may be structured that the magnets 61X and 61Y are disposed on the fixed body 5 and the coils 62X and 62Y are disposed on the movable body 3.

As shown in FIG. 4, the movable body 3 is provided with a first face 301 and a second face 302, which are located on opposite sides in the "X"-axis direction with an optical axis "L" interposed therebetween, and a third face 303 and a fourth face 304 which are located on opposite sides in the "Y"-axis direction with the optical axis "L" interposed therebetween. The shake correction drive mechanism 6 is disposed on two faces, i.e., one of the first face 301 and the second face 302, and one of the third face 303 and the fourth face 304. In this embodiment, the second magnetic drive mechanism 6Y is disposed on the first face 301 facing the "+X" direction. Further, the first magnetic drive mechanism 6X is disposed on the fourth face 304 facing the "−Y" direction. The faces on which the shake correction drive mechanism 6 is disposed are limited to two faces and thus, a shape of the optical unit 1 with a shake correction function when viewed in the "Z"-axis direction (optical axis "L" direction) is reduced.

Further, the first flexible printed circuit board 7 connected with the movable body 3 is extended through a face of an outer peripheral face of the movable body 3 where the shake correction drive mechanism 6 is not disposed. In this embodiment, the first flexible printed circuit board 7 is extended through the third face 303 facing the "+Y" direction. When the first flexible printed circuit board 7 is extended in a direction where the shake correction drive mechanism 6 is not disposed, the first flexible printed circuit board 7 can be extended along a side face of the movable body 3 in the "Z"-axis (optical axis "L") direction. In this embodiment, as described below, a first folded portion 71 formed by bending the first flexible printed circuit board 7 to the "+Z" direction and then folding back once to the reverse direction is disposed on the side face in the "+Y" direction of the movable body 3.

(Movable Body)

As shown in FIGS. 2 and 3, the movable body 3 includes the optical module 2 and a holder frame 30 which holds the optical module 2. The optical module 2 includes a housing 20 formed in a rectangular shape when viewed in the optical axis "L" direction, a circuit board 25 disposed at an end part in the "−Z" direction of the housing 20, a tube part 26 protruded to the "+Z" direction from the housing 20, a lens group 2A (optical element) held by the tube part 26, and a lens drive mechanism 27 (see FIGS. 4 and 5) disposed on an inside of the housing 20.

The lens drive mechanism 27 performs focusing for an object to be photographed by adjusting a lens position of the lens group 2A arranged in the optical axis "L" direction. In this embodiment, the lens drive mechanism 27 includes a magnetic drive mechanism. In accordance with an embodiment of the present disclosure, the lens drive mechanism 27 may include a drive source other than the magnetic drive mechanism. For example, the lens drive mechanism 27 may include a motor. The lens drive mechanism 27 is disposed on an opposite side to the first magnetic drive mechanism 6X or the second magnetic drive mechanism 6Y with the optical axis "L" interposed therebetween. In this embodiment, the lens drive mechanism 27 is disposed on an opposite side to the first magnetic drive mechanism 6X with the optical axis "L" interposed therebetween.

The holder frame 30 is a frame-shaped member surrounding an outer peripheral side of the optical module 2. The housing 20 is provided with a first side face 21 facing the "+X" direction, a second side face 22 facing the "−X" direction, a third side face 23 facing the "+Y" direction, and a fourth side face 24 facing the "−Y" direction. The holder frame 30 is provided with a first frame part 31 along the first side face 21 of the housing 20, a second frame part 32 along the second side face 22, a third frame part 33 along the third side face 23, and a fourth frame part 34 along the fourth side face 24. The first frame part 31, the second frame part 32 and the fourth frame part 34 are abutted with the housing 20. On the other hand, a space "S" is provided between the third frame part 33 and the third side face 23 of the housing 20 (see FIG. 5). Further, the third frame part 33 is provided with a cut-out part 35 which is formed by cutting out an end part in the "−Z" direction of the third frame part 33 toward the "+Z" direction.

The first folded portion 71 formed by folding back the first flexible printed circuit board 7 once is disposed in the space "S" provided between the third frame part 33 and the third side face 23 of the housing 20. The first folded portion 71 is extended in the "Z"-axis (optical axis "L") direction along the side face 23 in the "+Y" direction of the housing 20. The first flexible printed circuit board 7 is bent at a substantially right angle at an end part in the "−Z" direction of the first folded portion 71 and is passed through the cut-out part 35 provided in the third frame part 33 and is extended to the "+Y" direction side with respect to the holder frame 30.

As shown in FIGS. 2 and 3, the holder frame 30 includes first supporting point parts 41 of the gimbal mechanism 4. In this embodiment, the first supporting point parts 41 are respectively provided at two positions on an inner face of a corner part where the second frame part 32 and the third frame part 33 are connected with each other, and on an inner face of a corner part where the first frame part 31 and the fourth frame part 34 are connected with each other. The first supporting point part 41 includes a recessed part 43 which is recessed to an outer side in the radial direction and a first thrust receiving member 44 which is disposed in the recessed part 43. As shown in FIG. 6, the first thrust receiving member 44 is provided with a first plate part 441 in a plate shape extending in the "Z"-axis (optical axis "L") direction, a second plate part 442 which is bent at a substantially right angle from an end part in the "−Z" direction of the first plate part 441 and is extended to an inner side in the radial direction, and a spherical body 444 which is fixed from an inner side in the radial direction to a through-hole 443 penetrating through the first plate part 441. The first supporting point part 41 is positioned in the "Z"-axis (optical axis "L") direction by abutting the second plate part 442 in the "Z"-axis (optical axis "L") direction with an inner face in the "−Z" direction of the recessed part 43 provided in the holder frame 30.

The first thrust receiving member 44 is made of metal and the spherical body 444 is fixed to the first plate part 441 by welding. The spherical body 444 is point-contacted with the first support part 901 provided in the gimbal frame 9. The first support part 901 is formed with a concave curved face whose curvature radius is larger than a radius of the spherical body 444 and is elastically contacted with the spherical body 444 from an inner side in the radial direction.

The holder frame 30 is provided with protruded parts 36 which are protruded from end faces in the "+Z" direction of the first frame part 31, the second frame part 32, the third frame part 33 and the fourth frame part 34. The protruded parts 36 are respectively provided at one position at a center in the "Y"-axis direction of the first frame part 31 and the second frame part 32, and at a center in the "X"-axis direction of the third frame part 33 and the fourth frame part 34. The protruded parts 36 provided at four positions have the same protruded height to the "+Z" direction. The protruded parts 36 function as a stopper which restricts a swing range around the first axial line "R1" of the movable body 3. In other words, when the movable body 3 is swung around the first axis "R1", a swing range of the movable body 3 is restricted by abutting the protruded part 36 with the fixed body 5. As described below, the fixed body 5 includes a first cover 51 which faces an outer peripheral portion of the movable body 3 in the "Z"-axis (optical axis "L") direction. Therefore, a swing range of the movable body 3 is restricted by abutting the protruded part 36 with the first cover 51.

The holder frame 30 is provided with magnet disposing recessed parts 37 on which the magnet 61X of the first magnetic drive mechanism 6X and the magnet 61Y of the second magnetic drive mechanism 6Y are disposed. In this embodiment, the magnet disposing recessed part 37 is formed in the first frame part 31 and the fourth frame part 34. The magnet disposing recessed part 37 is recessed to an inner side in the radial direction. In this embodiment, the holder frame 30 is made of resin and thus, a yoke member 63 in a plate shape is disposed in the magnet disposing recessed part 37. The yoke members 63 are fixed to inner faces of the magnet disposing recessed parts 37, and the magnets 61X and 61Y are fixed to outer side faces in the radial direction of the yoke members 63. Each of the magnets 61X and 61Y is magnetized so that magnets of an outer side face in the radial direction are different from each other with a magnetized polarizing line located at a substantially center in the "Z"-axis (optical axis "L") direction as a boundary.

(Fixed Body)

The fixed body 5 includes a case 50, the first cover 51 and a second cover 52 which are fixed to the case 50, and a wiring cover 53. In this embodiment, the case 50 is made of resin, and the first cover 51, the second cover 52 and the wiring cover 53 are made of nonmagnetic metal. The case 50 is provided with an outer frame part 50A surrounding an outer peripheral side of the movable body 3, and a wiring accommodation part 50B which is protruded from an end part on the "−Z" direction side of the outer frame part 50A to the "+Y" direction. The first cover 51 is fixed to an end part in the "+Z" direction of the outer frame part 50A. The second cover 52 is fixed to an end part in the "−Z" direction of the outer frame part 50A and the wiring accommodation part 50B. The wiring cover 53 is fixed to an end part in the "+Z" direction of the wiring accommodation part 50B.

Elastic engaging parts 58 are provided at outer circumferential edges of the first cover 51, the second cover 52 and the wiring cover 53. Further, claw parts 59 are provided on an outer peripheral face of the case 50. The elastic engaging part 58 is a metal piece extending in the "Z"-axis (optical axis "L") direction and is provided with an opening part to which the claw part 59 is fitted. The claw part 59 is protruded to an outer side in the radial direction from an inner face of the recessed part formed on an outer peripheral face of the case 50. The first cover 51, the second cover 52 and the wiring cover 53 are fixed to the case 50 by engaging the elastic engaging parts 58 with the claw parts 59.

The first cover 51 is provided with two elastic engaging parts 58 extended in the "Z" direction at respective edges in the three directions except the "+Y" direction. An outer peripheral face at an end part in the "+Z" direction of the outer frame part 50A is provided with the claw part 59 at a position corresponding to each of the elastic engaging parts 58 provided in the first cover 51. The second cover 52 is provided with two elastic engaging parts 58 extended in the "+Z" direction at respective edges in four directions. Outer peripheral faces of end parts in the "−Z" direction of the outer frame part 50A and the wiring accommodation part 50B are provided with the claw part 59 at a position corresponding to each of the elastic engaging parts 58 provided in the second cover 52. The wiring cover 53 is provided with two elastic engaging parts 58 extended in the "−Z" direction at each of edges in the two directions, i.e., the "+X" direction and the "−X" direction respectively. An outer peripheral face of an end part in the "+Z" direction of the wiring accommodation part 50B is provided with a claw part 59 at a position corresponding to each of the elastic engaging parts 58 provided in the wiring cover 53.

The first cover 51 faces an outer peripheral portion of the movable body 3 in the "Z"-axis direction which is disposed on an inner side of the outer frame part 50A and thereby, the movable body 3 is prevented from projecting to the "+Z" direction. The first cover 51 is provided with an opening part 510 formed in a substantially rectangular shape. In this embodiment, a part of the gimbal frame 9 is protruded to the "+Z" direction through the opening part 510. Further, the tube part 26 of the optical module 2 is protruded to the "+Z" direction through a center hole 90 provided at a center in the radial direction of the gimbal frame 9. The first cover 51 is located at an end part in the "+Z" direction of the fixed body 5. Therefore, in this embodiment, parts of the optical module 2 and the gimbal frame 9 are protruded to the "+Z" direction side with respect to the end part in the "+Z" direction of the fixed body 5.

In this embodiment, a first end part 5A (see FIG. 5) which is an end part in the "+Z" direction of the fixed body 5 is a face in the "+Z" direction of the first cover 51. Further, as described below, the gimbal frame 9 is provided with the first frame portion 91 which is located in the "+Z" direction with respect to the first end part 5A. In addition, the movable body 3 is provided with the tube part 26 which is a movable body protruded portion located in the "+Z" direction with respect to the first end part 5A.

The outer frame part 50A is provided with a first frame part 501 and a second frame part 502, which are extended parallel to the "Y"-axis direction on the "+X" direction side and the "−X" direction side of the movable body 3, and a third frame part 503 and a fourth frame part 504 which are extended parallel to the "X"-axis direction on the "+Y" direction side and the "−Y" direction side of the movable body 3. The wiring accommodation part 50B is provided with a fifth frame part 505 and a sixth frame part 506, which are extended parallel to the "+Y" direction from end parts in the "−Z" direction of the first frame part 501 and the second frame part 502, and a seventh frame part 507 extended in the "X"-axis direction which is connected with end parts in the "+Y" direction of the fifth frame part 505 and the sixth frame part 506.

The outer frame part 50A includes the second supporting point part 42 of the gimbal mechanism 4. In this embodiment, the second supporting point parts 42 are respectively provided at two positions on an inner face of a corner part where the first frame part 501 and the third frame part 503 are connected with each other and on an inner face of a corner part where the second frame part 502 and the fourth frame part 504 are connected with each other. The second supporting point part 42 includes a recessed part 45 which is recessed to an outer side in the radial direction and a second thrust receiving member 46 which is disposed in the recessed part 45. As shown in FIG. 6, the second thrust receiving member 46 is provided with a first plate part 461 extending in the optical axis "L" direction, a second plate part 462 which is bent at a substantially right angle from an end part in the "−Z" direction of the first plate part 461 and is extended to an inner side in the radial direction, and a spherical body 464 which is fixed from an inner side in the radial direction to a through-hole 463 penetrating through the first plate part 461. The second supporting point part 42 is positioned in the "Z"-axis (optical axis "L") direction by abutting the second plate part 462 with an inner face in the "−Z" direction of the recessed part 45 provided in the outer frame part 50A in the "Z"-axis (optical axis "L") direction.

The second thrust receiving member 46 is made of metal and the spherical body 464 is fixed to the first plate part 461 by welding. The spherical body 464 is point-contacted with the second support part 902 provided in the gimbal frame 9. The second support part 902 is formed with a concave curved face whose curvature radius is larger than a radius of the spherical body 464 and is elastically contacted with the spherical body 464 from an inner side in the radial direction.

The outer frame part 50A is provided with coil arrangement holes 54 to which the coil 62X of the first magnetic drive mechanism 6X and the coil 62Y of the second magnetic drive mechanism 6Y are fixed with an adhesive or the like. In this embodiment, the coil arrangement holes 54 are penetrated through the first frame part 501 and the fourth frame part 504. Each of the coils 62X and 62Y is an air core coil in an elliptical shape, and two long sides located on the "+Z" direction side and the "−Z" direction side are utilized as effective sides. A second flexible printed circuit board 8 is fixed to the first frame part 501 and the fourth frame part 504 of the outer frame part 50A from an outer side in the radial direction. The second flexible printed circuit board 8 is provided with a first circuit board portion 81, which is overlapped with the coil arrangement hole 54 of the fourth frame part 504 from an outer side in the radial direction, and a second circuit board portion 82 which is overlapped with the coil arrangement hole 54 of the first frame part 501 from an outer side in the radial direction.

Rectangular magnetic plates 64 are respectively disposed between the first circuit board portion 81 and the coil 62X and between the second circuit board portion 82 and the coil 62Y. The magnetic plate 64 disposed between the first circuit board portion 81 and the coil 62X faces the magnet 61X to structure a magnetic spring for returning the movable body 3 to a turning reference position in a turning direction around the "X"-axis. Further, the magnetic plate 64 disposed between the second circuit board portion 82 and the coil 62Y faces the magnet 61Y to structure a magnetic spring for returning the movable body 3 to a turning reference position in a turning direction around the "Y"-axis.

The magnetic plates 64 are provided with rectangular through holes at positions overlapping with center holes of the coils 62X and 62Y, and a magnetic sensor 65 is disposed in the through hole. The magnetic sensor 65 is, for example, a Hall element. The optical unit 1 with a shake correction function detects a swing angle around the "X"-axis of the movable body 3 based on an output of the magnetic sensor 65 disposed at a center of the coil 62X. Further, the optical unit 1 with a shake correction function detects a swing angle around the "Y"-axis of the movable body 3 based on an output of the magnetic sensor 65 disposed at a center of the coil 62Y.

(Gimbal Frame)

As shown in FIG. 6, the gimbal frame 9 is provided with the first frame portion 91 in a substantially square shape when viewed in the "Z"-axis direction and second frame portions 92 which are bent from four corner parts of the first frame portion 91 at a substantially right angle and are extended to the "−Z" direction. The second frame portions 92 are disposed at first diagonal positions on both sides in the first axial line "R1" direction of the first frame portion 91 and at second diagonal positions on both sides in the second axial line "R2" direction of the first frame portion 91. A center of the first frame portion 91 is provided with the center hole 90 penetrating through the first frame portion 91. As shown in FIG. 5, the first frame portion 91 is overlapped with the housing 20 of the optical module 2 and the holder frame 30 when viewed in the "Z"-axis (optical axis "L") direction.

The first frame portion 91 is provided with a rectangular portion 910 in a square shape whose diagonal directions are the first axial line "R1" direction and the second axial line "R2" direction when viewed in the "Z"-axis (optical axis "L") direction, first protruded portions 913 protruded from corner parts on both sides in the first axial line "R1" direction of the rectangular portion 910 to an outer side in the radial direction, and second protruded portions 914 protruded from corner parts on both sides in the second axial line "R2" direction of the rectangular portion 910 to an outer side in the radial direction. As shown in FIG. 4, the first frame portion 91 is located on an inner peripheral side of the holder frame 30 when viewed in the "Z"-axis (optical axis "L") direction except the second protruded portions 914 disposed in the corner parts in the second axial line "R2" direction of the four corners parts (first protruded portions 913 and second protruded portions 914) connected with the second frame portion 92.

As shown in FIGS. 1 and 6, a center portion 911 of the rectangular portion 910 of the first frame portion 91 located at a center in the second axial line "R2" direction is recessed to the "−Z" direction, and corner portions 912 at both ends in the second axial line "R2" direction are located on the "+Z" direction side with respect to the center portion 911. In other words, the corner portions 912 in the second axial line "R2" direction of the first frame portion 91 are separated from the movable body 3 with respect to the center portion 911. Therefore, even when the movable body 3 is swung around the first axial line "R1" on the "−Z" direction side with respect to the gimbal frame 9 and both ends in the second axial line "R2" direction of the movable body 3 (in this embodiment, the corner parts in the second axial line "R2" direction of the housing 20) are moved in the "Z"-axis direction, a collision of the movable body 3 with the gimbal frame 9 can be avoided.

Further, the center portion 911 is extended to the corner parts in the first axial line "R1" direction of the first frame portion 91. In this embodiment, the corner parts in the first axial line "R1" direction of the first frame portion 91 are portions of the gimbal frame 9 which are moved largest in the "Z"-axis (optical axis "L") direction in a case that the movable body 3 is swung around the second axial line "R2" and the gimbal frame 9 is swung around the second axial line "R2" with the second supporting point parts 42 as a turning center. As described above, in a case that the corner parts in the first axial line "R1" direction of the first frame portion 91 are formed in the most recessed shape to the "−Z" direction, an operation space of the gimbal frame 9 when the movable body 3 is swung can be reduced in the "Z"-axis (optical axis "L") direction. Therefore, a height required in the "Z"-axis (optical axis "L") direction of a space for disposing the optical unit 1 with a shake correction function can be reduced.

The second frame portion 92 is provided with first support part extended parts 93, which are provided at two corner parts on the first axial line "R1" of the gimbal frame 9, and second support part extended parts 94 provided at two corner parts on the second axial line "R2" of the gimbal frame 9. The first support part extended part 93 is extended in a straight line shape to the "−Z" direction from the first protruded portion 913 provided in the corner part in the first axial line "R1" direction of the first frame portion 91. A tip end portion of the first support part extended part 93 is formed with a first support part 901 having a concave curved face which is recessed to an inner side in the radial direction by press working. The second support part extended part 94 is provided with a first portion 941 extended to the "−Z" direction from the second protruded portion 914 provided in the corner portion in the second axial line "R2" direction of the first frame portion 91, a second portion 942 which is bent at a substantially right angle from the first portion 941 and is extended to an outer side in the radial direction, and a third portion 943 which is bent at a substantially right angle from the second portion 942 and is extended to the "−Z" direction. A tip end portion of the third portion 943 is formed with a second support part 902 having a concave curved face which is recessed to an inner side in the radial direction by press working.

The first support part extended part 93 is disposed in a cut-out part 511 which is formed by cutting out a corner part in the first axial line "R1" direction of the opening part 510 of the first cover 51 to an outer side in the radial direction. The first supporting point part 41 which is provided on the movable body 3 side and serves as a supporting point part of the gimbal mechanism 4 is disposed on the "−Z" direction side with respect to the cut-out part 511, and a tip end part of the first support part extended part 93 is supported by the first supporting point part 41. Further, the second support part extended part 94 is disposed in a cut-out part 512 which is formed by cutting out a corner part in the second axial line "R2" direction of the opening part 510 of the first cover 51 to an outer side in the radial direction. The second supporting point part 42 which is provided on the fixed body 5 side and serves as a supporting point part of the gimbal mechanism 4 is disposed on the "−Z" direction side with respect to the cut-out part 512, and a tip end part of the second support part extended part 94 is supported by the second supporting point part 42.

The first support part extended part 93 and the second support part extended part 94 are elastically deformed in the radial direction. Therefore, the first support part 901 provided in the tip end part of the first support part extended part 93 is elastically contacted with the spherical body 444 provided in the first supporting point part 41. Further, the second support part 902 provided in the tip end part of the second support part extended part 94 is elastically contacted with the spherical body 464 provided in the second supporting point part 42. As a result, the first support part extended part 93 and the second support part extended part 94 are hard to be disengaged from the first supporting point part 41 and the second supporting point part 42 and thus, deviation of the supporting point parts is suppressed.

(Extended Shape of First Flexible Printed Circuit Board 7)

The first flexible printed circuit board 7 is folded back once on an inner side of the holder frame 30 to form the first folded portion 71 and is extended through the cut-out part 35 of the holder frame 30 to the "+Y" direction, and the first flexible printed circuit board 7 is folded back in an inside of the outer frame part 50A and is extended to an inner side of the wiring accommodation part 50B through a cut-out part 508 which is formed by cutting out an end part in the "−Z" direction of the third frame part 503 of the outer frame part 50A to the "+Z" direction. The first flexible printed circuit board 7 is provided with a second folded portion 72 which is extended to the "+Y" direction on an inner side of the wiring accommodation part 50B and is folded back once to the reverse direction, and a third folded portion 73 overlapped with the second folded portion 72 on the "+Z" direction side.

The wiring cover 53 is provided with a cut-out part 531 which is formed by cutting out a substantially center of its edge in the "−Y" direction to the "+Y" direction. The third folded portion 73 of the first flexible printed circuit board 7 is extended to an outer side of the wiring accommodation part 50B through the cut-out part 531 and is extended to the "+Y" direction side along the wiring cover 53. The first flexible printed circuit board 7 includes a fixing part 74 which is fixed to the wiring cover 53. The fixing part 74 is fixed to an edge of the cut-out part 531.

The first flexible printed circuit board 7 includes a flexible circuit board 70 and reinforcing plates 75 which are fixed to the flexible circuit board 70. The reinforcing plate 75 is disposed at three positions, i.e., the first folded portion 71, the second folded portion 72 and the fixing part 74. In each of the first folded portion 71 and the second folded portion 72, the reinforcing plate 75 is disposed in a bent portion of the flexible circuit board 70 which is bent to a reverse direction. Therefore, the reinforcing plate 75 is sandwiched by the flexible circuit board 70 and functions as a spacer. The reinforcing plate 75 provided in the fixing part 74 is disposed between the wiring cover 53 and the flexible circuit board 70 and functions as a spacer between the wiring cover 53 and the flexible circuit board 70.

Principal Operations and Effects in this Embodiment

As described above, the optical unit with a shake correction function 1 in this embodiment includes the movable body 3 having the optical module 2, the gimbal mechanism 4 structured to swingably support the movable body 3 around the first axial line "R1" intersecting the optical axis "L" and swingably support the movable body 3 around the second axial line "R2" intersecting the optical axis "L" and the first axial line "R1", the fixed body 5 which supports the movable body 3 through the gimbal mechanism 4, and the shake correction drive mechanism 6 structured to swing the movable body 3 around the first axial line "R1" and around the second axial line "R2". The gimbal mechanism 4 includes the gimbal frame 9 which connects the movable body 3 with the fixed body 5, the gimbal frame 9 is provided with the first frame portion 91 located on one side ("+Z" direction side) with respect to the first end part 5A which is an end part on the one side ("+Z" direction side) in the optical axis "L" direction of the fixed body 5, and the movable body 3 is provided with the tube part 26 which is the movable body protruded portion located on the one side ("+Z" direction side) in the optical axis "L" direction with respect to the first end part 5A.

In this embodiment, as described above, the first frame portion 91 of the gimbal frame 9 which connects the movable body 3 with the fixed body 5 and the tube part 26 of the movable body 3 are protruded to one side ("+Z" direction side) in the optical axis "L" direction with respect to the first end part 5A (face in the "+Z" direction of the first cover 51) which is an end part on the one side ("+Z" direction side) in the optical axis "L" direction of the fixed body 5. In a structure that parts of the movable body 3 and the gimbal frame 9 are protruded from the fixed body 5 in the optical axis "L" direction, it is sufficient that the fixed body 5 accommodates the portions of the movable body 3 and the gimbal frame 9 on the other side ("−Z" direction side) in the optical axis "L" direction with respect to the first frame portion 91 and the tube part 26. Therefore, a height in the optical axis "L" direction of the fixed body 5 can be reduced and thus, thickness in the optical axis "L" direction of the fixed body 5 is reduced. Accordingly, a height in the optical axis "L" direction of an arrangement space of the optical unit 1 with a shake correction function can be reduced and thus, the optical unit 1 with a shake correction function can be mounted on a thin device.

(a) and (b) of FIG. 7 are explanatory views showing an arrangement space of an optical unit 1 with a shake correction function. (a) of FIG. 7 is an explanatory view showing an arrangement space of the optical unit 1 with a shake correction function in this embodiment, and (b) of FIG. 7 is an explanatory view showing an arrangement space of an optical unit 1A with a shake correction function in a comparison example. In a case that the optical unit 1 with a shake correction function 1 in this embodiment is mounted on a portable device 100 such as a cell phone with a camera, as shown in (a) of FIG. 7, the optical unit 1 with a shake correction function is covered by a cover glass 101 which is an external member of the portable device 100. A fixing cushion member 102 is disposed between the optical unit 1 with a shake correction function and the cover glass 101. The fixing cushion member 102 is provided so that its one end is contacted with the cover glass 101 and the other end is contacted with the fixed body 5.

As shown in (a) of FIG. 7, in the optical unit 1 with a shake correction function in this embodiment, a part of the gimbal frame 9 and a part of the movable body 3 are protruded to a space between the first end part 5A of the fixed body 5 and the cover glass 101 and thus, a height "H1" in the optical axis "L" direction of the fixed body 5 is small. On the other hand, as shown in (b) of FIG. 7, in the optical unit 1A with a shake correction function in the comparison example, the whole of the gimbal frame 9 and the movable body 3 is accommodated in an inside of the fixed body 5 and thus, a height "H2" in the optical axis "L" direction of the fixed body 5 is larger than the height "H1". When a height in the optical axis "L" direction of the fixing cushion member 102 is defined as "H3", a height in the optical axis "L" direction of an arrangement space of an optical unit with a shake correction function is "H1+H3" in this embodiment and "H2+H3" in the comparison example.

Therefore, in the optical unit 1 with a shake correction function in this embodiment, the height "H1" in the optical axis "L" direction of the fixed body 5 can be reduced by a protruded amount of a part of the gimbal frame 9 and a part of the movable body 3 (first frame portion 91 and tube part 26) which are protruded to the "+Z" direction from the fixed body 5. As a result, the height "H1+H3" in the optical axis "L" direction of an arrangement space of the optical unit 1 with a shake correction function can be reduced. Therefore, the optical unit 1 with a shake correction function in this embodiment can be mounted on a thin device.

In this embodiment, the rectangular portion 910 of the first frame portion 91 is located on an inner peripheral side with respect to an outer circumferential edge of the movable body 3 (in this embodiment, outer circumferential edge of the holder frame 30) when viewed in the optical axis "L" direction. Therefore, except the diagonal positions in the first axial line "R1" direction and the second axial line "R2" direction, an outer shape of the gimbal frame 9 is smaller than that of the movable body 3 when viewed in the optical axis "L" direction and thus, the gimbal frame 9 gives little influence on an outer shape of the optical unit 1 with a shake correction function when viewed in the optical axis "L" direction. Accordingly, an outer shape of the optical unit 1 with a shake correction function when viewed in the optical axis "L" direction can be made small.

In this embodiment, the tube part 26 and the first frame portion 91 which are the protruded portions in the "+Z" direction from the fixed body 5 are located on an inner peripheral side with respect to an outer circumferential edge of the fixed body 5 when viewed in the optical axis "L" direction. Therefore, the portion protruded in the "+Z" direction from the fixed body 5 does not project to an outer peripheral side of the fixed body when viewed in the optical axis "L" direction. Accordingly, an outer shape of the optical unit 1 with a shake correction function when viewed in the optical axis "L" direction can be made small.

In this embodiment, the fixed body 5 includes the outer frame part 50A in a rectangular shape when viewed in the optical axis "L" direction, and the gimbal frame 9 is provided with the second frame portion 92 disposed at the first diagonal positions on both sides in the first axial line "R1" direction of the first frame portion 91 and at the second diagonal positions on both sides in the second axial line "R2" direction of the first frame portion 91, and one of the first diagonal position and the second diagonal position is the diagonal position of the outer frame part 50A. For example, the other of the first diagonal position and the second diagonal position is the diagonal position of the movable body 3 and is located on an inner peripheral side with respect to the outer frame part 50A. Therefore, a part of the second frame portion 92 (second support part extended parts 94) of the gimbal frame 9 is disposed at the diagonal position of the outer frame part 50A, and the other portion of the second frame portion 92 (first support part extended parts 93) is disposed in the movable body 3, and the first frame portion 91 is disposed on one side ("+Z" direction side) in the optical axis "L" direction with respect to the fixed body 5. Accordingly, the fixed body 5 can be formed in a shape so as not to be affected by the gimbal frame 9 except the diagonal position in the second axial line "R2" direction where a part of the second frame portion 92 (second support part extended parts 94) is disposed. As a result, an outer shape of the fixed body 5 when viewed in the optical axis "L" direction can be made small.

In this embodiment, the second frame portion 92 is extended from the first frame portion 91 to the other side ("−Z" direction) in the optical axis "L" direction. As described above, when the second frame portion 92 is extended in the optical axis "L" direction, a dimension in the diagonal direction of the gimbal frame 9 (dimensions in the first axial line "R1" direction and the second axial line "R2" direction) can be reduced. Therefore, an outer shape of the optical unit 1 with a shake correction function when viewed in the optical axis "L" direction can be made small.

In this embodiment, the second support part extended part 94 of the second frame portion 92 which is supported by the fixed body 5 is formed in a bent shape provided with the first portion 941 extended from the first frame portion 91 in the "−Z" direction, the second portion 942 extended from the first portion 941 to an outer side in the radial direction, and the third portion 943 extended from the second portion 942 in the "−Z" direction. As described above, the second frame portion 92 is bent in a shape so as to be enlarged to an outer side in the radial direction in the middle in the optical axis "L" direction and thus, a dimension in the diagonal direction of the first frame portion 91 can be reduced. Therefore, when viewed in the an optical axis "L" direction, an outer shape of a portion of the gimbal frame 9 which is protruded from the first end part 5A of the fixed body 5 can be made small.

In this embodiment, the first frame portion 91 is provided with the rectangular portion 910 whose diagonal directions when viewed in the optical axis "L" direction are the first axial line "R1" direction and the second axial line "R2" direction, the first protruded portions 913 which are protruded from corner parts on both sides in the first axial line "R1" direction of the rectangular portion 910 to an outer side in the radial direction, and the second protruded portions 914 which are protruded from corner parts on both sides in the second axial line "R2" direction of the rectangular portion 910 to an outer side in the radial direction. Each of the first protruded portion 913 and the second protruded portion 914 is connected with the second frame portion 92, and at least the rectangular portion 910 of the first frame portion 91 is located on an inner peripheral side with respect to an outer circumferential edge of the movable body 3 when viewed in the optical axis "L" direction. Therefore, a portion of the first frame portion 91 which is disposed on an outer peripheral side with respect to the movable body 3 is limited to portions which are protruded from diagonal positions of the first frame to an outer side in the radial direction and thus, influence of the gimbal frame 9 on a portion of the fixed body 5 disposed on an outer peripheral side with respect to the movable body 3 can be reduced.

In the gimbal frame 9 in this embodiment, the second support part extended parts 94 disposed at the second diagonal positions (diagonal positions in the second axial line "R2" direction) are swingably supported around the second axial line "R2" at the diagonal positions of the outer frame part 50A. Further, the rectangular portion 910 of the gimbal frame 9 is formed in a shape so that its corner portions on both sides in the second axial line "R2" direction are located on one side ("+Z" direction) in the optical axis "L" direction with respect to its center portion in the second axial line "R2" direction. In the shape of the frame formed as described above, a distance in the optical axis "L" direction between the corner portions on both sides in the second axial line "R2" direction of the gimbal frame 9 and the movable body 3 is large and thus, when the movable body 3 to be swung around the first axial line "R1", an operation space of a portion of the movable body 3 which is moved largely in the optical axis "L" direction can be secured. Therefore, a collision of the movable body 3 with the gimbal frame 9 can be avoided. Further, the portion of the gimbal frame 9 which is moved largely in the optical axis "L" direction when the movable body 3 is swung around the second axial line "R2" is recessed to the other side ("−Z" direction) in the optical axis "L" direction and thus, an operation space in the optical axis "L" direction of the gimbal frame 9 can be made small. Therefore, a height in the optical axis "L" direction of a space for installing the optical unit 1 with a shake correction function can be reduced.

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising an optical module;
    wherein the optical module includes a lens drive mechanism;
    a gimbal mechanism structured to swingably support the movable body around a first axial line intersecting an optical axis and swingably support the movable body around a second axial line intersecting the optical axis and the first axial line;
    a fixed body which supports the movable body through the gimbal mechanism; and
    a shake correction drive mechanism structured to swing the movable body around the first axial line and around the second axial line;
    wherein the gimbal mechanism comprises a gimbal frame which connects the movable body with the fixed body;
    wherein the gimbal frame comprises a first frame portion located on one side in an optical axis direction with respect to a first end part which is an end part on the one side of the fixed body;
    wherein the movable body comprises a movable body protruded portion which is located on the one side in the optical axis direction with respect to the first end part;
    wherein the fixed body comprises an outer frame part in a rectangular shape which is viewed in the optical axis direction,
    the gimbal frame comprises second frame portions which are disposed at first diagonal positions on both sides in the first axial line direction of the first frame portion and at second diagonal positions on both sides in the second axial line direction of the first frame portion, and
    one of the first diagonal position and the second diagonal position is a diagonal position of the outer frame part.

2. The optical unit with a shake correction function according to claim 1, wherein at least a part of the first frame portion is located on an inner peripheral side with respect to an outer circumferential edge of the movable body which is viewed in the optical axis direction.

3. The optical unit with a shake correction function according to claim 1, wherein the movable body protruded portion and the first frame portion are located on an inner peripheral side with respect to an outer circumferential edge of the fixed body which is viewed in the optical axis direction.

4. The optical unit with a shake correction function according to claim 1, wherein the other of the first diagonal position and the second diagonal position is a diagonal position of the movable body and is located on an inner peripheral side with respect to the outer frame part.

5. The optical unit with a shake correction function according to claim 1, wherein the second frame portion is extended from the first frame portion to an other side in the optical axis direction.

6. The optical unit with a shake correction function according to claim 5, wherein at least a part of the second frame portion comprises:
    a first portion which is extended from the first frame portion to the other side;
    a second portion which is extended from the first portion to an outer side in the radial direction, and
    a third portion which is extended from the second portion to the other side.

7. The optical unit with a shake correction function according to claim 1, wherein the first frame portion comprises:
  a rectangular portion whose diagonal directions viewed in the optical axis direction are the first axial line direction and the second axial line direction;
  first protruded portions which are protruded from corner parts on both sides in the first axial line direction of the rectangular portion to an outer side in the radial direction; and
  second protruded portions which are protruded from corner parts on both sides in the second axial line direction of the rectangular portion to an outer side in the radial direction,
  each of the first protruded portion and the second protruded portion is connected with the second frame portion, and
  at least the rectangular portion of the first frame portion is located on an inner peripheral side with respect to an outer circumferential edge of the movable body which is viewed in the optical axis direction.

8. The optical unit with a shake correction function according to claim 7, wherein
  the second frame portion which is disposed at the second diagonal positions is swingably supported around the second axial line at the diagonal positions of the outer frame part, and
  the rectangular portion is formed in a shape so that corner portions on both sides in the second axial line direction of the rectangular portion are located on the one side in the optical axis direction with respect to a center portion in the second axial line direction of the rectangular portion.

* * * * *